United States Patent
Phillips et al.

(10) Patent No.: US 8,789,198 B2
(45) Date of Patent: *Jul. 22, 2014

(54) TRIGGERING A PRIVATE BROWSING FUNCTION OF A WEB BROWSER APPLICATION PROGRAM

(75) Inventors: Christopher Phillips, Chandlers Ford (GB); Matthew Whitbourne, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 5 days.

This patent is subject to a terminal disclaimer.

(21) Appl. No.: 13/331,213

(22) Filed: Dec. 20, 2011

(65) Prior Publication Data

US 2012/0185947 A1      Jul. 19, 2012

(30) Foreign Application Priority Data

Jan. 14, 2011   (EP) ..................................... 11150937

(51) Int. Cl.
*H04L 29/06*      (2006.01)
*G06F 21/00*      (2013.01)
*H04L 29/08*      (2006.01)
*G06F 21/62*      (2013.01)

(52) U.S. Cl.
CPC ............ *H04L 67/04* (2013.01); *G06F 21/6263* (2013.01)
USPC ........................................................... 726/26

(58) Field of Classification Search
None
See application file for complete search history.

(56) References Cited

U.S. PATENT DOCUMENTS

| | | | |
|---|---|---|---|
| 6,959,420 B1 * | 10/2005 | Mitchell et al. | 715/745 |
| 2005/0138137 A1 | 6/2005 | Encarnacion et al. | |
| 2008/0275963 A1 | 11/2008 | Hatfield | |
| 2011/0167492 A1 * | 7/2011 | Ghosh et al. | 726/23 |

FOREIGN PATENT DOCUMENTS

EP      1143340 A1      10/2001

* cited by examiner

*Primary Examiner* — Gilberto Barron, Jr.
*Assistant Examiner* — Simon Kanaan
(74) *Attorney, Agent, or Firm* — A. Bruce Clay

(57) ABSTRACT

A private browsing function of a web browser application program may be triggered for a browser by a browser or by a URL provider. Upon receipt of the URI by a web browser, the URI is inspected for the presence of a private browsing indicator. When the URI is found to contain a private browsing indicator, operation of the private browsing function for the web browser application program is triggered.

6 Claims, 7 Drawing Sheets

TRIGGERING A PRIVATE BROWSING FUNCTION OF A WEB BROWSER APPLICATION PROGRAM

BACKGROUND

The present invention relates, in general, to web browsers, and, in particular, to triggering a private browsing function of a web browser application program.

Web browser application programs enable users to browse web pages, upload or download content and enter data. During such browsing, web browsers are commonly arranged to save or cache local copies of data related to the performed browsing. For example, a web browser may cache a browsing history detailing the Uniform Resource Locators (URLs) browsed or visited. The web browser may also cache search or form field data or the usernames and passwords entered by a user.

Generally, web browser application programs comprise privacy functionality commonly referred to as private browsing. Such privacy functionality may also be referred to as privacy mode, private tab, private window, InPrivate™ browsing or Incognito™. Such privacy functionality, referred to herein collectively as private browsing, is activated by a user and is arranged to ensure that a predetermined set of data that would otherwise be cached, is not saved or is deleted at the end of the private browsing session. The data to which private browsing applies is commonly defined in a predetermined list that may be modified by a user. Such data is omitted from the cache for all URLs browsed or visited while the private browsing function is active. The user is responsible for activating the private browsing function and, in some circumstances, for deactivating the private browsing function.

BRIEF SUMMARY

According to one embodiment of the present invention, a method of triggering a private browsing function of a web browser application program is provided. A URI is received by a web browser application program that includes a private browsing function. The URI is inspected for an associated predetermined private browsing indicator. Upon identification of a private browsing indicator associated with the URI, operation of the private browsing function of the web browser application program is triggered.

According to one embodiment of the present invention, a method of creating a URI is arranged to trigger a private browsing function of a web browser application program. A URI for triggering private browsing is identified. A private browsing indicator is associated with the URI.

According to one embodiment of the present invention, an apparatus triggers a private browsing function of a web browser application program. The apparatus comprises a processor, and memory connected to the processor, wherein the memory is encoded with instructions. A URI is received for a web browser application program. The web browser application program comprises a private browsing function. The URI is inspected for an associated predetermined private browsing indicator. In response to the identification of the private browsing indicator associated with the URI, instructions trigger operation of the private browsing function of the web browser application program.

According to one embodiment of the present invention, a computer program product triggers a private browsing function of a web browser application program. The computer program product comprises a computer readable storage medium having computer readable program code embodied therewith. The computer readable program code is configured to receive a URI for a web browser application program, the web browser application program comprising a private browsing function. The computer readable program code is configured to inspect the URI for an associated predetermined private browsing indicator. In response to the identification of the private browsing indicator associated with the URI, the computer readable program code is configured to trigger operation of the private browsing function of the web browser application program.

DETAILED DESCRIPTION

Figure 1A:
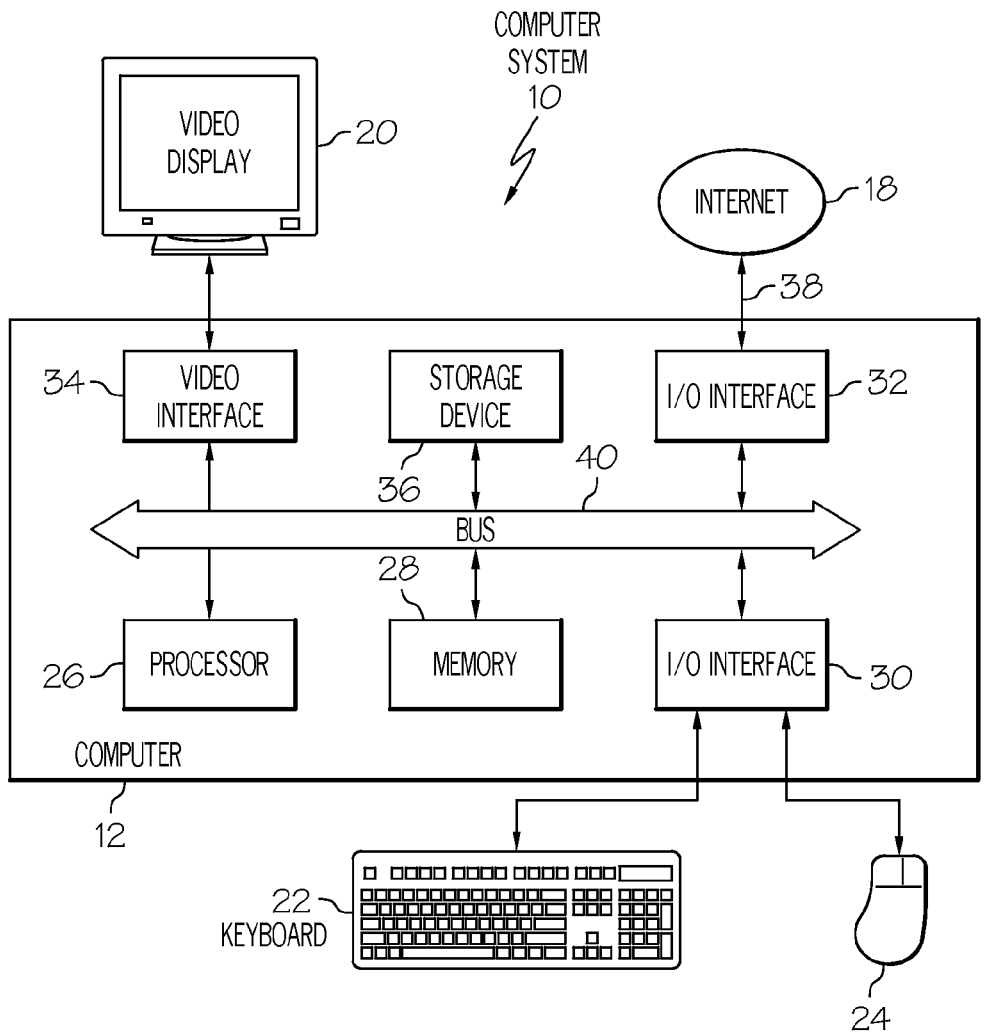
FIG. 1A is one example of a computer system 10 suitable for executing computer software for use with one embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1A is one example of a computer system 10 suitable for executing computer software for use with an embodiment of the present invention. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

Figure 1B:
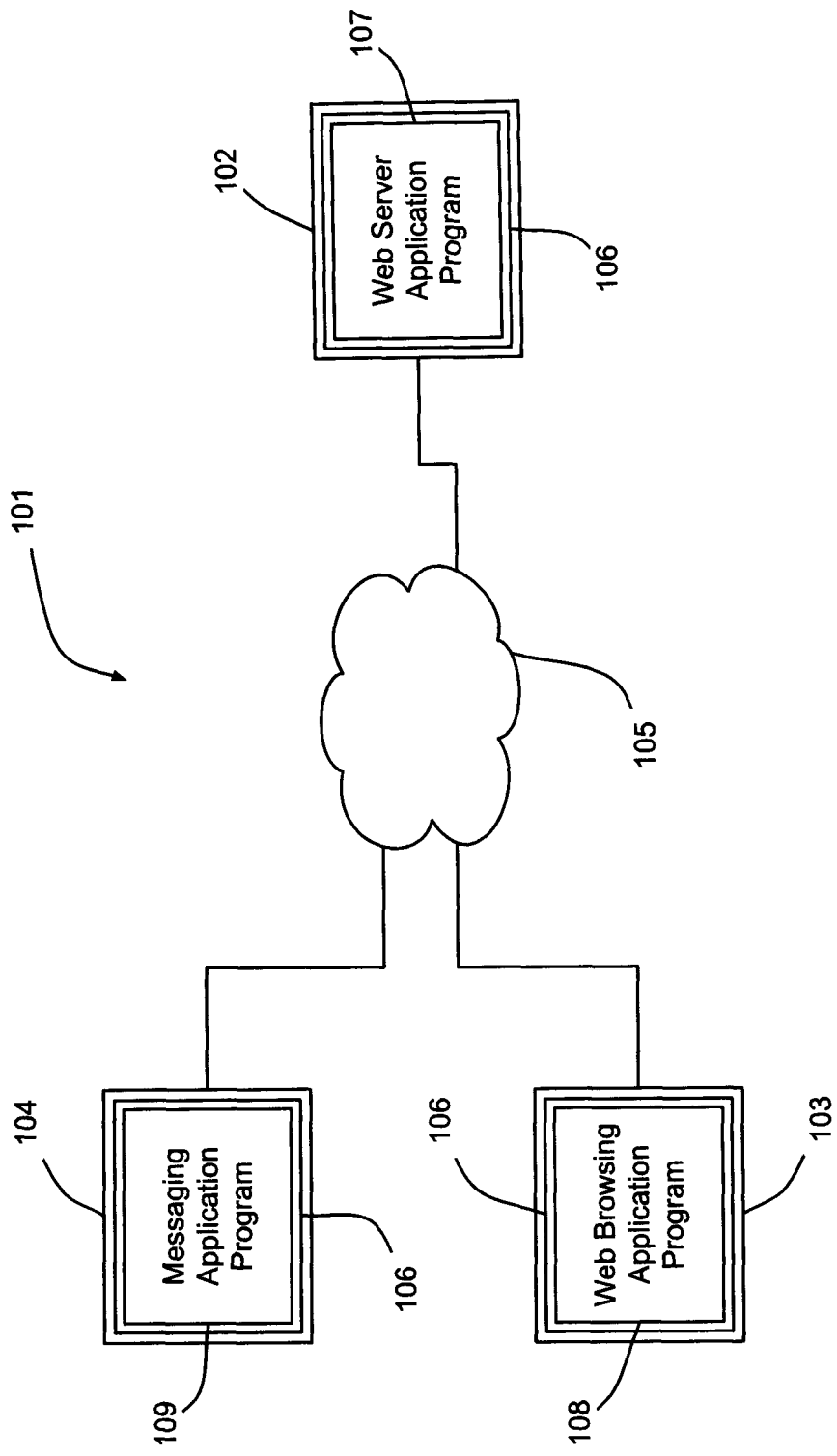
FIG. 1B is a schematic illustration of a network of computers.

With reference to FIG. 1B, a computer system 101 comprises a first computer 102, a second computer 103, and a third computer 104, each of which may be embodied as the computer system 10 of FIG. 1A, interconnected by a network 105 in the form of the Internet. Each of the computers 102, 103, and 104 is loaded with a respective operating system 106 arranged to provide a platform or processing environment for running one or more application programs. In one embodiment, the first computer 102 is loaded with a web server application program 107 arranged to provide access to a set of web pages for the second computer 103 and the third computer 104 via the Internet 105. An associated Universal Resource Identifier/Uniform Resource Identifier (URI) in the form of a Universal Resource Locator/Uniform Resource Locator (URL) identifies each such web page.

The second computer 103 is loaded with a web browser application program 108 arranged to enable a user to access or download web pages such as those provided via the web server application program 107. The third computer 104 is loaded with a messaging application program 109 in the form of an email client application program arranged to enable a user to send and receive messages in the form of email to other users via the Internet 105.

Figure 2:
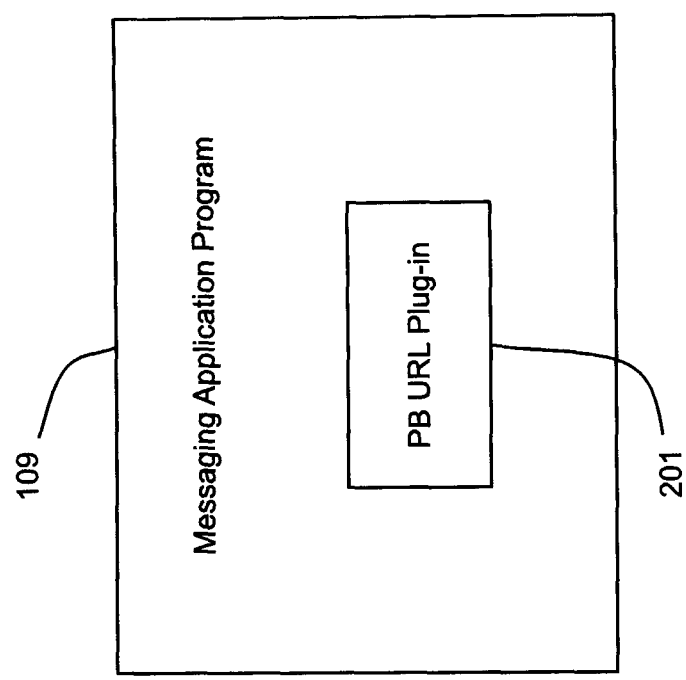
FIG. 2 is a schematic illustration of a messaging application program running on a computer in the network of FIG. 1B.

With reference to FIG. 2, the email client 109 comprises a private browsing URL (PB URL) module 201, such as in the form of a plug-in. In the present embodiment, the PB URL module 201 is arranged to modify URLs that are inserted by the user into outgoing messages. The outgoing URLs are associated with a private browsing indicator arranged to trigger the private browsing function of any suitably enabled web browsing application program that inputs the URL. In the present embodiment, the user is provided with the option of activating the PB URL module 201 when a URL is inserted into a message. In other words, in response to the insertion of a URL into a message, the user is given a choice of whether the URL should be inserted without change or associated with a private browsing indicator. In the present embodiment, if the user chooses to convert the URL to a private browsing URL, the user is provided with an option to trigger private browsing for all URLs or to restrict the scope of the private browsing to the URL or a sub-domain, thereof, as described in further detail below.

Figure 3:
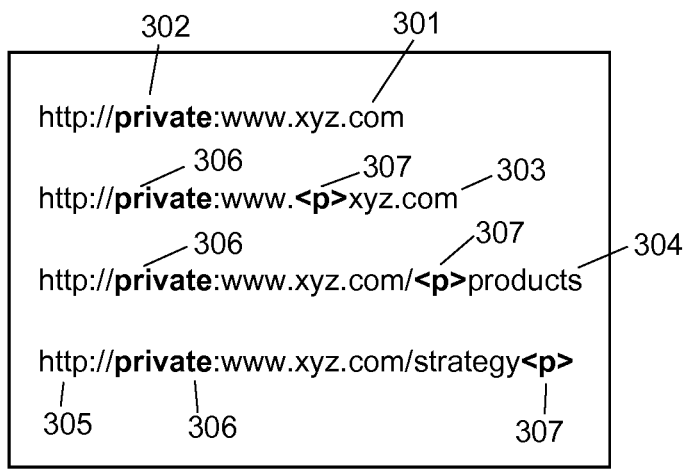
FIG. 3 is a table illustrating variants of private browsing URLs generated by the messaging application program of FIG. 2.

With reference to FIG. 3, in a first example URL 301 the private browsing indicator comprises a private browsing (PB) tag 302. The PB tag 302 is arranged to indicate to any web browser application program that, if present, private browsing functionality should be activated. The PB tag 302 comprises the term "private:" inserted between the protocol definition and the standard URL.

If the user chooses to restrict the scope of the private browsing to the relevant URL or a sub-domain of the URL, the private browsing indicator then comprises first and second tags in the form of a PB header tag and a PB scope tag. In FIG. 3, second URL 303, third URL 304, and fourth URL 305 each comprise respective PB header tags 306 and PB scope tags 307. The PB header tags 306 comprise the term "private:" inserted between the protocol definition and the standard URL. In other words, the PB header tag 306 is pre-pended to the URL. The PB scope tags 307 comprise the term "<p>" inserted within the respective URL's 303, 304, and 305. The position of the PB scope tag 307 within the respective URL is arranged to determine the scope of any resulting private browsing of that URL. In the second URL 303, the PB scope tag 307 is inserted before the top-level domain (TLD) designation (xyz.com) and thus arranged to indicate that any private browsing functionality should be limited in scope to the browsing of the relevant TLD and any of its sub-domains. In the third URL 304, the PB scope tag 307 is inserted before a sub-domain (products) of the URL and is thus arranged to indicate that any private browsing functionality should be limited in scope to the browsing of the relevant sub-domain and any of its sub-domains. In other words, private browsing should only be triggered for browsing of the xyz.com/products sub-domain. In the fourth URL 305, the PB scope tag 307 is appended to the URL and is thus arranged to indicate that any private browsing functionality should be limited in scope exclusively to the browsing of the URL as specified. In other words, private browsing should only be triggered for browsing of the xyz.com/strategy sub-domain but not triggered for any sub-domains, thereof.

Figure 5:
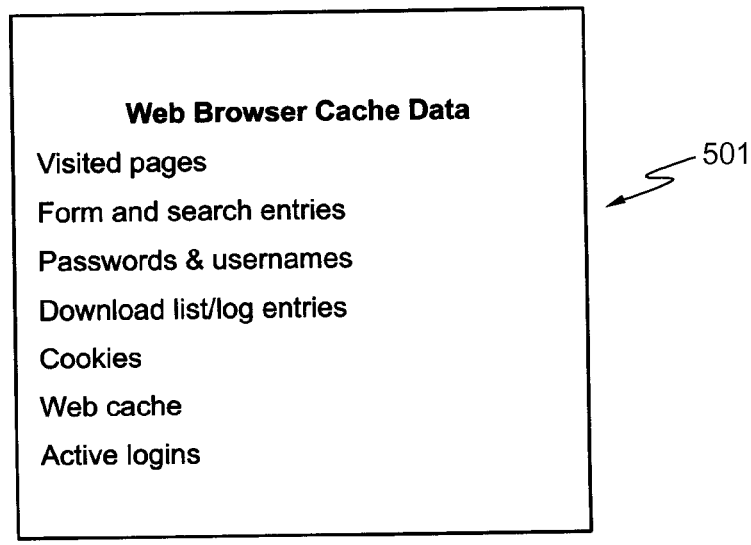
FIG. 5 is a table of examples of data excluded from storage in the web browsing application program during private browsing.
Figure 4:
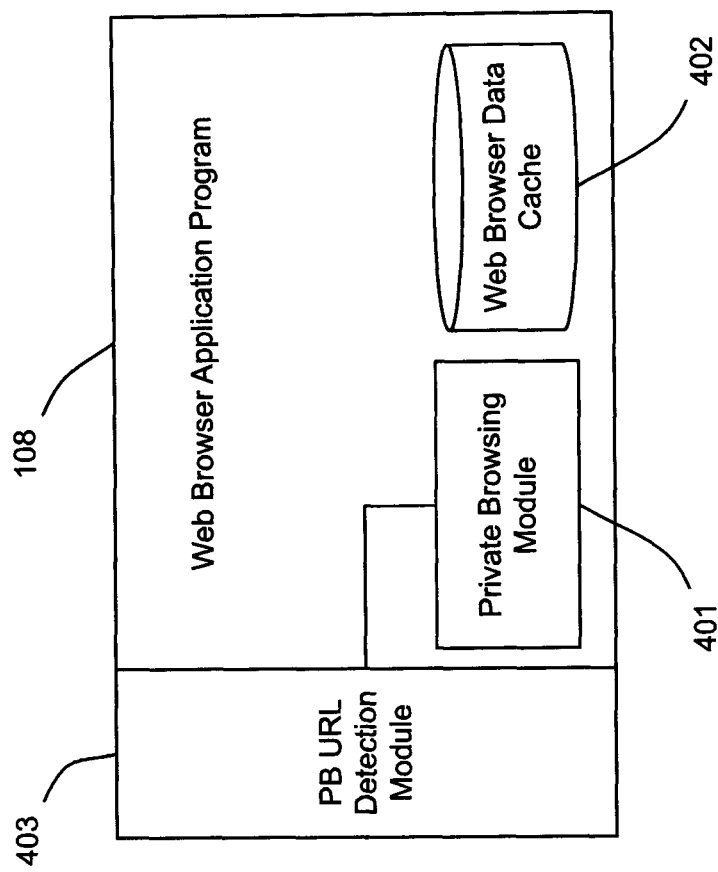
FIG. 4 is a schematic illustration of a web browsing application program running on a computer in the network of FIG. 1B.

With reference to FIG. 4, the web browser application program 108 comprises a private browsing module 401, a web browser data cache 402 and a private browsing URL detection module 403. The web browser data cache 402 is used by the web browser application program 108 during standard browsing to record a predetermined set of data relating to the web browsing activity of a user. The table of FIG. 5 provides a list of the web browser data 501 cached, in one embodiment, by the web browser application program 108.

The private browsing module 401 is operable in one embodiment, to ensure that such web browser data 501 is not cached for a given browsing session. In other words, once the private browsing module 401 is activated, none of the web browser data 501 is cached for the remainder of the browsing session. The private browsing module 401 is further arranged to be selectively operable in accordance with any PB scope tag 307 defined for a given PB URL. In other words, the private browsing module 401 is arranged to be triggered only when the specified URL or sub-domain thereof is browsed within the relevant browsing session.

The private browsing URL detection module 403 is arranged to inspect URLs for the web browser application program and determine whether any PB indicators, such as PB header tags 306 or scope tags 307, are present in the URL. In response to any detected PB indicators, the PB URL detection module 403 is arranged to trigger the PB module 401, accordingly. As will be understood by those skilled in the art, a web browser application program may process URLs from many different sources. For example, URLs may be input from an internal source such as bookmarks, browsing history, or a browsed web page link, or from an external source in the form of another application program. For example, the input URL may be provided from a message or document.

Figure 6:
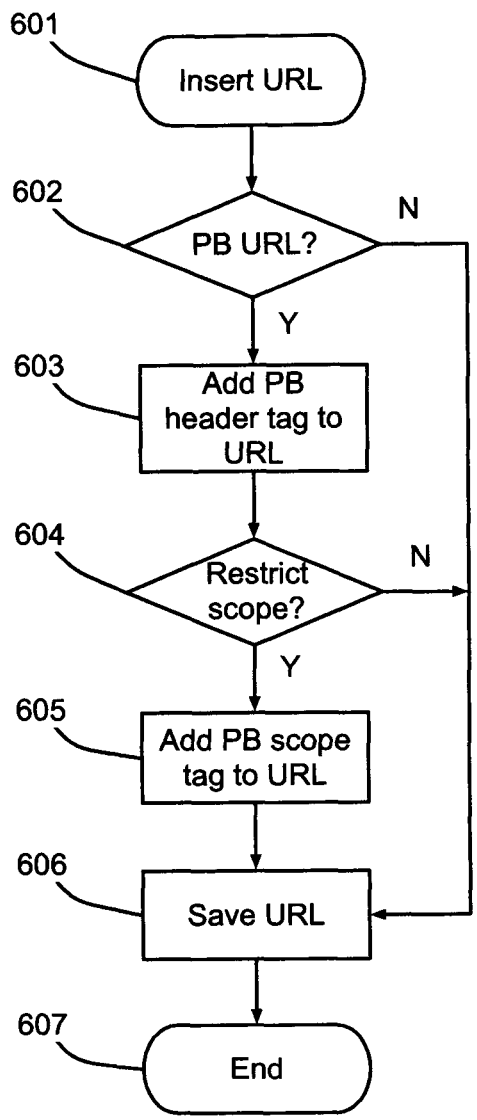
FIG. 6 is a flow chart illustrating the processing performed by the messaging application program of FIG. 2 when creating a private browsing URL.

The processing performed by the messaging application program 109 (FIG. 1) when inserting a URL into a message will now be described further with reference to the flow chart of FIG. 6. Processing is initiated at step 601 in response to the insertion of a URL into a message and processing then moves to step 602. At step 602, the user is provided with the option to insert the URL as a private browsing URL, and, if the user selects this option, then processing moves to step 603. At step 603, the PB header tag 306 is associated with the URL by pre-pending to the URL in front of the protocol identifier, and processing moves to step 604. At step 604 the user is provided with the option to restrict the scope of the private browsing that may be triggered by the PB URL and if this option is selected, processing moves to step 605. At step 605, a PB scope tag 307 is inserted in the PB URL in accordance with the restriction on the scope indicated by the user, and processing moves to step 606. At step 606, the PB URL is saved into the message, and processing moves to step 607 and ends. If at step 602, private browsing modification of the URL is not selected by the user, then processing moves to step 606 and proceeds as described above. If at step 604, no restriction on the scope of the private browsing triggered by the PB URL is selected, then processing moves to step 606 and proceeds as described above.

Figure 7:
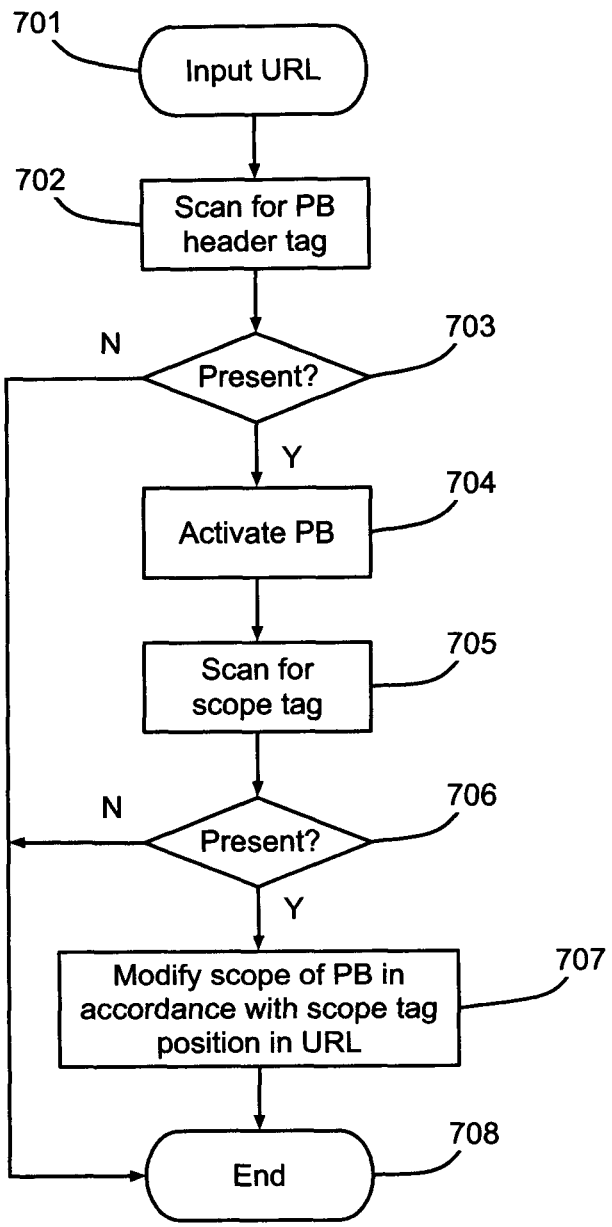
FIG. 7 is a flow chart illustrating the processing performed by the web browsing application program of FIG. 4 in response of the accessing of a private browsing URL.

The processing performed by the PB URL detection module 403 in response to the detection of a PB URL will now be described further with reference to the flow chart of FIG. 7. Processing is initiated at step 701 in response to the receipt of a URL by the web browser application program 108, and processing then moves to step 702. At step 702, the PB URL detection module 403 scans the received URL for a PB header tag 306 and processing moves to step 703. If at step 703 a PB header tag 306 has been identified, then processing moves to step 704. At step 704, the private browsing module 401 is activated for the remainder of the current browsing session and processing moves to step 705. At step 705, the received PB URL is further inspected to identify any PB scope tag 307, and processing moves to step 706. If a PB scope tag 307 is identified in the PB URL then processing moves to step 707. At step 707, the scope of the private browsing performed by the private browsing module 401 is reduced in accordance with the position of the identified PB scope tag 307, and processing then moves to step 708 and ends. If at step 703 no PB tag is identified in the received URL, then processing moves to step 708 and ends. If at step 706 no PB scope tag 307 is identified in the received PB URL, then the private browsing module 401 remains active for all browsing for the remainder of the current browsing session, and processing by the PB URL detection module 403 moves to step 708 and ends.

In one embodiment, the PB URL is supplied by a web server application program in response to a request, such as an HTML request, for a standard URL. In other words, private browsing functionality in a requesting web browser application program is triggered by the web server application program. Such a PB URL response may be provided by redirection, either automatically or on user request input on the website.

In one embodiment, where a user or web browser application program has a predetermined relationship with a web server or website, preferences may be provided by the web server or website to automatically respond to a request for a given URL with a PB URL.

In one embodiment, a messaging application program is arranged to modify URL's in outgoing or incoming messages in dependence on the recipient or sender of the message or any combination of recipients or senders. In other words, URL's are converted to PB URL's in dependence on the destination or source of the message that contains the URL. Such automatic conversion of URLs to PB URLs may be specified in a contacts list or address book related to a given messaging application program.

As will be understood by those skilled in the art, the creation of a PB URL by any given application program may by initiated automatically, for example as determined by user or system settings, or manually. The PB URLs may be created for all or a predetermined sub-set of URLs. For example, all intranet links may be excluded from private browsing while all internet links are included. Any action performed in relation to a URL may trigger its conversion to a PB URL. For example, the copying, forwarding, sending, saving, bookmarking, or linking may be arranged to trigger the conversion of a standard URL to a PB URL.

As will be understood by those skilled in the art, the private browsing functionality of a web browser application program may, once triggered, operate for any predetermined duration. For example, the private browsing functionality may operate for a given browsing session as described above or indefinitely until terminated by a user or for a predetermined time period. The private browsing functionality may apply to the current or selected browsing window, or tab, or all open tabs, or all tabs opened in the browsing session.

In one embodiment, the PB header tag, as described above, is omitted and a single PB scope tag is associated with a given URL. The single PB scope tag is arranged to provide the function of both the header and scope tags described above. The single PB scope tag is positioned relative to the URL, as described above, to indicate reduced scope and pre-pended to the URL to trigger private browsing for all URLs. In one embodiment, a web browser, capable of working with URLs having such a scope enabled single PB tag mark-up, is arranged to inspect the full URL prior to issuing a request for the URL.

In one embodiment, the user is prompted once they are about to move in or out of the PB scope, so as to provide the option of continuing or ceasing private browsing. In one embodiment, a range of tags is provided for indicating different levels of privacy. For example, tags may indicate that a sub-set of the web browsing data can be omitted from the cache.

As will be understood by those skilled in the art, PB indicators such as the PB tags described herein may be associated with a given URL in any suitable manner. Such tags may be pre-pended, appended or inserted and in any suitable position or associated by any other technical mechanism suitable for a given application.

As will be understood by those skilled in the art, the term URL used herein is used to refer to any suitable means of uniquely locating or identifying a web page or other resource. For example, a Universal Resource Identifier (URI) may be used to identify a web page or other resource and the mechanisms disclosed herein with respect to private browsing are equally applicable to URI's as they are to URL's since a URL is a form of a URI. Furthermore, the PB mechanisms described herein are equally applicable to private networks, such as intranets, as they are to public networks, such as the Internet.

Embodiments of the invention enable external control of triggering the private browsing behavior of a web browser by tagging the URL input to the browser. In other words, private browsing may be initiated by the provider of a URL or web material, rather than by the user of a web browser. Privacy is thus controlled by the URL not by the web browser application. The URL with one or more privacy triggers thus automates the process of launching private browsing sessions. The scope of the private browsing provides the choice of session based or domain scoped URL's and thus enables a finer grain of control of private browsing functionality.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. An apparatus for triggering a private browsing function of a web browser application program, comprising:
    a processor; and
    memory connected to the processor, wherein the memory is encoded with instructions and wherein the instructions when executed comprise:
    instructions for receiving a URI for a web browser application program, said web browser application program further comprising a private browsing function;
    instructions for inspecting said received URI for an associated predetermined private browsing indicator, said private browsing indicator comprising a tag inserted into said received URI;
    in response to identification of said tag inserted into said received URI, instructions for triggering operation of the private browsing function of the web browser application program;
    in response to operation of the private browsing function, instructions for deleting a predetermined set of data received by the web browser application program from said received URI and stored in a web browser data cache, said set of data comprising at least visited pages, form and search entries, password and usernames, download list/log entries, cookies, web cache, and active logins; and
    upon completion of a private browsing session to said received URI, returning to a non-private browsing session until identification of another private browsing indicator.

2. The apparatus of claim 1 wherein said tag comprises a header tag and a scope tag which trigger the private browsing function of the web browser application program for only a sub-domain of said URI.

3. The apparatus of claim 2 wherein said header tag is pre-pended to said URI between said URI and any associated protocol specification.

4. A computer program product for triggering a private browsing function of a web browser application program, the computer program product comprising a computer readable storage medium having computer readable program code embodied therewith, the computer readable program code comprising:
    computer readable program code configured to receive a URI for a web browser application program, said web browser application program further comprising a private browsing function;
    computer readable program code configured to inspect said received URI for an associated predetermined private browsing indicator, said private browsing indicator comprising a tag inserted into said received URI;
    in response to identification of said tag inserted into said received URI, computer readable program code configured to trigger operation of the private browsing function of the web browser application program;
    in response to operation of the private browsing function, computer readable program code configured to delete a predetermined set of data received by the web browser application program from said received URI and stored in a web browser data cache, said set of data comprising at least visited pages, form and search entries, password and usernames, download list/log entries, cookies, web cache, and active logins; and
    upon completion of a private browsing session to said received URI, computer readable program code configured to return to a non-private browsing session until identification of another private browsing indicator occurs.

5. The computer program product of claim 4, comprising computer readable program code configured to trigger the private browsing function of the web browser, for only a sub-domain of said URI, with said tag, wherein said tag comprises a header tag and a scope tag.

6. The computer program product of claim 5 wherein said header tag is pre-pended between said URI and any associated protocol specification.

* * * * *